(12) United States Patent
Nishiyama et al.

(10) Patent No.: US 7,077,543 B2
(45) Date of Patent: Jul. 18, 2006

(54) LIQUID CRYSTAL DISPLAY

(75) Inventors: Seiichi Nishiyama, Mobara (JP); Shigetake Takaku, Mobara (JP); Yoshiharu Takeda, Mobara (JP); Shigeo Mikoshiba, Tokyo (JP); Tomokazu Shiga, Kawasaki (JP); Koji Hashimoto, Kawasaki (JP)

(73) Assignees: Hitachi, Ltd., Tokyo (JP); Hitachi Electronic Devices Co., Ltd., Mobara (JP)

( * ) Notice: Subject to any disclaimer, the term of this patent is extended or adjusted under 35 U.S.C. 154(b) by 33 days.

(21) Appl. No.: 09/987,465

(22) Filed: Nov. 14, 2001

(65) Prior Publication Data
US 2002/0027774 A1 Mar. 7, 2002

Related U.S. Application Data

(63) Continuation of application No. 09/449,835, filed on Nov. 26, 1999, now Pat. No. 6,331,064.

(30) Foreign Application Priority Data
Nov. 27, 1998 (JP) .................... 10-336926

(51) Int. Cl.
G02F 1/1335 (2006.01)
H05B 41/00 (2006.01)

(52) U.S. Cl. .................. 362/225; 362/260; 362/29; 362/84; 349/70; 349/71

(58) Field of Classification Search .............. 362/23, 362/29, 311, 263, 260, 217, 225, 249, 219; 313/607, 234, 632, 491; 349/70, 71
See application file for complete search history.

(56) References Cited

U.S. PATENT DOCUMENTS

| 4,899,090 | A | * | 2/1990 | Yoshikke et al. | 313/607 |
|---|---|---|---|---|---|
| 5,012,396 | A | * | 4/1991 | Costa | 362/224 |
| 5,214,522 | A | * | 5/1993 | Tagawa | 362/223 |
| 5,325,024 | A | * | 6/1994 | Piejak et al. | 315/248 |
| 5,438,484 | A | * | 8/1995 | Kanda et al. | 362/31 |
| 5,485,057 | A | * | 1/1996 | Smallwood et al. | 362/221 |
| 5,514,934 | A | * | 5/1996 | Matsumoto et al. | 313/607 |
| 5,610,472 | A | * | 3/1997 | Schmitt, Jr. | 362/390 |
| 5,664,873 | A | * | 9/1997 | Kanda et al. | 362/97 |
| 6,084,360 | A | * | 7/2000 | Yokokawa et al. | 313/607 |
| 6,094,015 | A | * | 7/2000 | Wessels et al. | 315/291 |

FOREIGN PATENT DOCUMENTS

| JP | 61-185858 | 8/1986 |
|---|---|---|
| JP | 04109286 | 4/1992 |
| JP | 0582101 | 4/1993 |
| JP | 5-114387 | 5/1993 |
| JP | 08-241697 | 9/1996 |
| JP | 08-241698 | 9/1996 |
| JP | 09231822 | 9/1997 |
| JP | 10161117 | 6/1998 |
| JP | 10206872 | 8/1998 |

* cited by examiner

Primary Examiner—Thomas M. Sember
(74) Attorney, Agent, or Firm—Antonelli, Terry, Stout & Kraus, LLP.

(57) ABSTRACT

A liquid crystal display having a liquid crystal display panel for modulating light to form an image and a back light unit having a plurality of lamp tubes without inside electrodes and which are discharged by outside electrodes disposed along an outer surface of the at least one lamp tube, the back light unit being disposed behind the liquid crystal display panel. One outside electrode disposed at the at least one of the plurality of lamp tubes is electrically connected with another outside electrode disposed at an another adjacent lamp tube.

23 Claims, 15 Drawing Sheets

LIQUID CRYSTAL DISPLAY

CROSS-REFERENCE TO RELATED APPLICATION

This is a continuation of U.S. application Ser. No. 09/449,835, filed Nov. 26, 1999, now U.S. Pat. No. 6,331,064, the subject matter of which is incorporated by reference herein.

BACKGROUND OF THE INVENTION

The present invention relates to an liquid crystal display device. More specifically, the invention relates to a back light unit for a liquid crystal display panel.

A liquid crystal display panel is comprised the pair of opposed substrates and a liquid crystal layer interposed between the pair of substrates, wherein an array of pixels is formed in a horizontal plane of the liquid crystal display panel. In this case, a back light unit is needed, and such a back light unit is arranged in the back of the liquid crystal display panel. Thus, each pixel has only the function to control the amount of light switching by controlling the orientation of the liquid crystal molecules.

This back light includes a lamp tube, a diffusing plate and a reflector for supplying the light and uniformalizing the light irradiation of a liquid crystal display panel. A cold cathode fluorescent tube (CFL), whose length is almost equal to the length in a parallel direction of the liquid crystal display panel and which is supplied with a voltage by electrodes attached at both ends of the tube, is used as the lamp tube.

However, a liquid crystal display unit's life span is determined by a lamp tube's short life span. Although replacement of the lamp tube in the back light unit is not easy, all lamps should be replaced to maintain the brightness of the back light unit.

In addition, an electrode material inside the cold cathode fluorescent tube tends to adhere on the inner wall of the lamp tube due to sputtering which occurs while lighting, and so the lamp tube tends to become dark more and more due to the adhesion materials over time. That is, the adhesion materials become an alloy (amalgam) of the mercury inside the cold cathode fluorescent tube, and so the lamp tube's life span shortens more and more by consuming mercury.

SUMMARY OF THE INVENTION

The present invention was accomplished in recognition of the above problems, and, accordingly, it is an object of the present invention to provide a liquid crystal display panel in which the liquid crystal display unit's life span can be increased without the need to replace the lamp tube or the back light unit.

The above objects are achieved by a liquid crystal display device comprising a liquid crystal display panel for modulating light to form an image, and a back light unit having a lamp tube which is discharged by an electrode and is disposed behind said liquid crystal display panel, wherein said electrode is formed outside of said lamp tube.

Further, the above objects are achieved by a liquid crystal display device comprising a liquid crystal display panel having a pair of substrates, a liquid crystal layer interposed between said pair of substrates, and a back light unit having a lamp tube which is discharged by a pair of electrodes and is disposed behind said liquid crystal display panel, wherein said pair of electrodes are formed outside of said lamp tube and are disposed opposite to each other.

Further, the above objects are achieved by a liquid crystal display device comprising a liquid crystal display panel having a pair of substrates, a liquid crystal layer interposed between said pair of substrates, and a back light unit including a plurality of lamp tubes which are discharged by a pair of electrodes comprising a power supply electrode and a ground electrode which are disposed at a location opposite to a display area of said liquid crystal display panel, wherein said pair of electrodes are formed outside of said lamp tube and are formed opposite to each other.

Further, the above objects are achieved by a liquid crystal display device comprising, a liquid crystal display panel for modulating light to form an image, a back light unit including a plurality of lamp tubes which are discharged by a plurality of electrodes, wherein said electrodes are formed on said lamp tubes, and one of the electrodes is formed between a pair of electrodes.

Further, the above objects are achieved by a liquid crystal display device comprising, a liquid crystal display panel having a pair of substrates, a liquid crystal layer interposed between said pair of substrates, and a back light unit having a lamp tube which is discharged by a power supply electrode and a ground electrode formed outside of said lamp tube, wherein said lamp tube has an elbow-shaped bend and is disposed at a location opposite to a display area of said liquid crystal display panel.

Further, the above objects are achieved by a back light unit to supply light for a liquid crystal display panel, which back light unit comprises a lamp tube which is discharged by a power supply electrode and a ground electrode formed on a surface of the outside of said lamp tube, wherein said power supply electrode is positioned on the central portion of said lamp tube.

Further, the above objects are achieved by a back light unit to supply light for a liquid crystal display panel, which back light unit comprises a lamp tube which is discharged by a power supply electrode and a ground electrode formed on a surface of the outside of said lamp tube, wherein said power supply electrode and said ground electrode are divided into two or more pairs, and said power supply electrode or said ground electrode are disposed side by side with respect to each other.

According to the constitution of this invention, the liquid crystal display unit's life span can be increased without changing the lamp tube or the back light unit.

BRIEF DESCRIPTION OF THE DRAWINGS

FIG. 12 is a front view and FIGS. 12(a) to 12(d) are side views of the liquid crystal display panel;

FIGS. 14A(1), 14B(1) and 14C(1) are sectional views taken on lines a'—a', b'—b' and c'—c' in FIGS. 14A, 14B and 14C, respectively;

DESCRIPTION OF THE PREFERRED EMBODIMENTS

Further objects and features of the present invention will become obvious from the following description when taken in conjunction with the drawings.

<A Liquid Crystal Display System>

Figure 1:
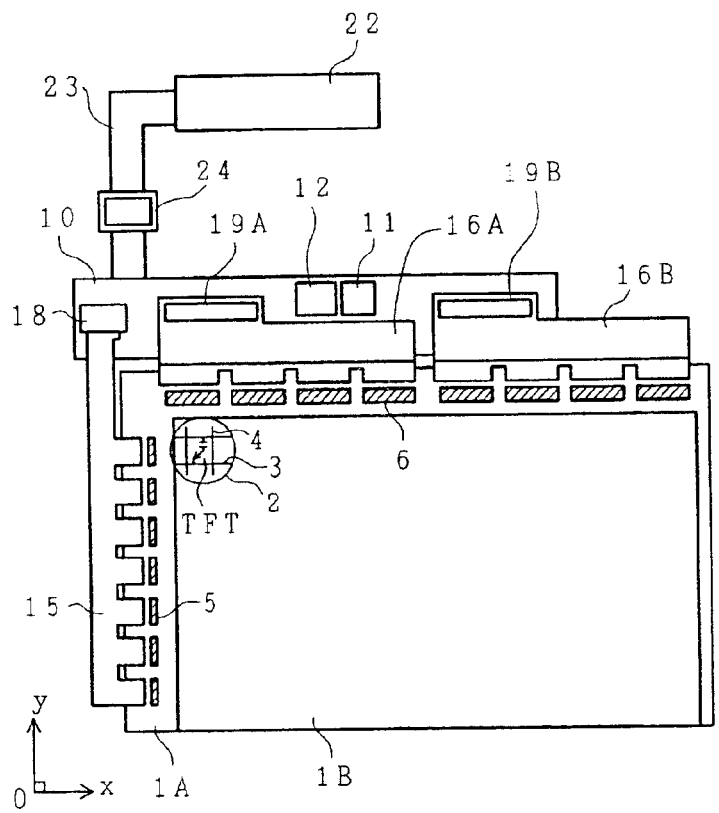
FIG. 1 is a plan view of essential portions illustrating a liquid crystal display panel.

FIG. 1 is a plan view of essential portions of a liquid crystal display panel. FIG. 1 is drawn corresponding to an actual geometrical arrangement. This embodiment illustrates an In Plane Switching (IPS) mode liquid crystal display with a wide viewing angle.

A liquid crystal display panel 1 is composed of substrates 1A, 1B and a liquid crystal layer interposed between substrates 1A, 1B. In this case, the substrate 1A is formed to be larger than the substrate 1B. Substrate 1A and 1B are arranged so that the lower side and right side almost match, as shown in FIG. 1. As a result, the left side and upper side of the substrate 1A form extended free areas compared with the substrate 1B, and a gate driver 15 and a drain driver 16 are formed on these areas.

A plurality of pixels are arranged in the form of a matrix in the area where each of the substrates 1A, 1B overlap. A typical pixel 2 has a gate line 3 extending in the direction x of FIG. 1 and arranged in the direction y, and a drain line 4 extending in the direction y of FIG. 1 and arranged in the direction x. This pixel 2 has a switching element TFT switched by at least supplying timing data through a gate line 3, and a pixel electrode supplied with image data through a drain line 4 and a TFT. In addition, each pixel 2 has a counter electrode and a storage capacitor Cstg, since this embodiment's display operates in the In-Plane Switching mode. And, the left edge of each gate line 3 extends outside the substrate 1B and is connected with the output terminal of a gate driver 5 formed on the substrate 1A.

In FIG. 1, two or more gate drivers 5 are formed. The gate lines 3 are divided into plural groups disposed adjacent to each other, and these groups are connected to a respective adjoining gate driver 5. Moreover, the upper end of each a drain line 4 is extended outside the substrate 1B and is connected with the output terminal of a drain driver 6 formed on the substrate 1A. In this case, similarly, the drain lines 4 are divided into plural groups disposed adjacent to each other, and these groups are connected to a respective adjoining drain driver 6. On the other hand, the gate drivers 5 and the drain drivers 6 may be formed on a printed circuit board 10 (a control circuit board 10) which is disposed adjacent to the liquid crystal display panel 1.

A control unit 12 which is provided to supply the input signal to a gate driver 5 and a drain driver 6 is formed on the printed circuit board 10, in addition to a power supply circuit 11. And, the signal from this control unit 12 is supplied to the gate drivers 5 and drain drivers 6 through a flexible printed circuit (a flexible printed gate circuit 15 and a flexible printed drain circuit 16A and 16B). That is, a connection terminal is opposed to each input of a gate driver 5, and the flexible printed circuit (the flexible printed gate circuit 15) is connected with the connection terminal. A part of the flexible printed gate circuit is overlapped on the control circuit board 10, and the overlapped portion is connected with a control circuit board on the board 10 through a connection port 18. The output signal from a control unit 12 formed on the control circuit board 10 is output to each gate driver 5 through the wiring layer on the control circuit board 10, the connection port 18 and the flexible printed gate circuit 15.

Moreover, a connection terminal is opposed to each input of a drain driver 6, and the flexible printed circuits 16A and 16B are connected with the connection terminal. A part of the flexible printed drain circuits 16A and 16B are overlapped on the control circuit board 10, and the overlapped portions are connected with a control circuit board 10 through connection ports 19A and 19B. The output signal from a control unit 12 formed on the control circuit board 10 is output to each drain driver 6 through the wiring layer on the control circuit board 10, the connection ports 19A and 19B and the flexible printed drain circuits 16A and 16B.

The flexible printed drain circuit is divided into flexible circuits 16A and 16B, as shown in FIG. 1, for the sake of preventing heat expansion with the increase in length in the direction x caused by enlarging the liquid crystal display panel 1. And, the output from the control unit 12 is input to a drain driver 6 through the connection ports 19A and 19B of the flexible printed drain circuits 16A and 16B. In addition, the image data is input from the image data source 22, via a cable 23 and an interface 24, to the control unit 12.

The liquid crystal display panel 1, the flexible printed gate circuit 15, and the flexible printed drain circuits 16A, 16B, along with the control circuit board 10, are flatly arranged in FIG. 1, however these circuits can be bent at right angles to the liquid crystal display panel 1 for reducing the display frame area outside the display area of the liquid crystal display panel 1. Reducing the display frame area contributes to the ability to extend the display area.

<A Liquid Crystal Display Module>

Figure 2:
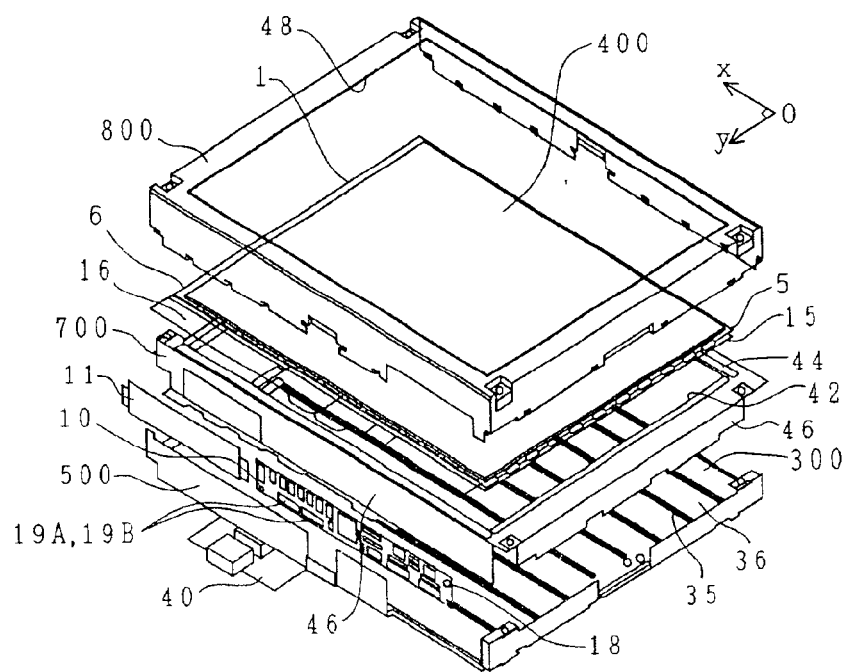
FIG. 2 is an exploded perspective view illustrating a liquid crystal display module.

FIG. 2 is an exploded perspective view illustrating a liquid crystal display module. The liquid crystal display module is composed of a liquid crystal display panel 400, a back light unit 300, a lower resin frame 500, an inner frame 700, and an upper frame 800. In this embodiment, a back light unit 300 and a reflector are formed on the lower resin frame 500. Moreover, it is possible for the lower resin frame 500 and the back light unit 300 to be molded as one. In that case, the lower resin frame 500 and back light unit 300 are able to be functionally distinguished, though they are difficult to be physically distinguished.

<A Liquid Crystal Display Panel>

Figure 3:
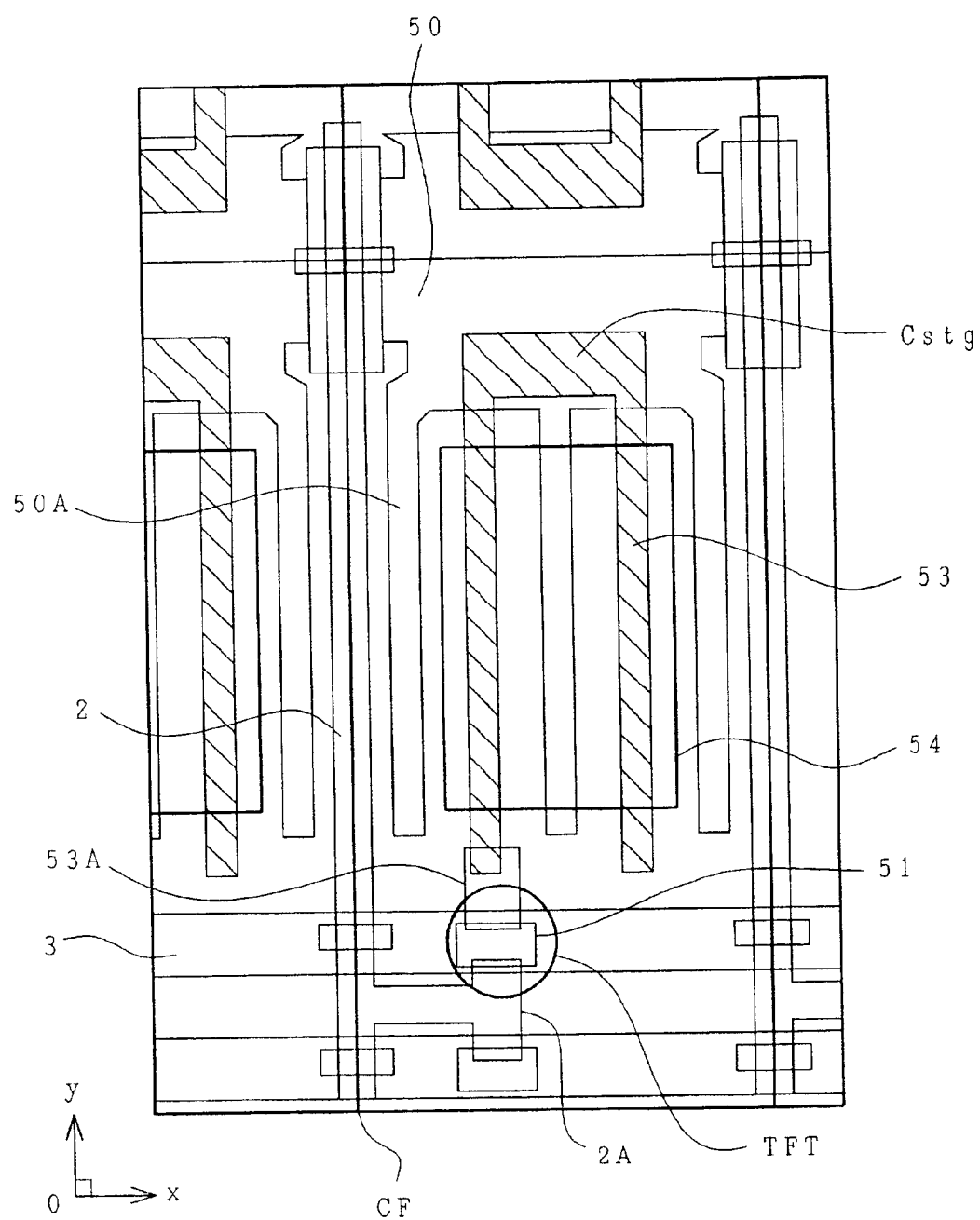
FIG. 3 is a plan view of essential portions illustrating a pixel and peripheries thereof in a liquid crystal display unit of an active matrix-type liquid crystal display.

The liquid crystal display panel 400 is composed of the gate drivers 5, the drain drivers 6, a liquid crystal display panel 1, the flexible printed gate circuit 15, and the flexible printed drain circuit 16 (16A, 16B). The output from a control circuit on the circuit board 10 is input to a gate driver 5 and a drain driver 6 through the flexible printed gate circuit 15 and the flexible printed drain circuits 16A, 16B. The output of a respective driver is input to a gate line 2 and a drain line 3 of the liquid crystal display panel 1. Here, a liquid crystal display panel 1 is composed of a plurality of pixels arranged in a display area in the form of a matrix. The arrangement of each pixel is shown in FIG. 3. A gate line 3 and a counter signal line 50 are formed in the direction x on the surface of the substrate 1A. And, the area enclosed by adjacent drain lines 2 formed in the direction y and the lines 3 and 50 form a pixel area.

The counter electrode 50A is formed of three parallel counter electrode members which do not connect with a gate line 3. Both side counter electrode members are disposed adjacent to a drain line 3, and the remaining counter electrode member is formed at the center of the pixel area. A gate line 3, a counter signal line 50, and a counter electrode 50A are formed on the surface of the substrate 1A, and these lines are covered by an insulated layer which consists of silicon nitride (SiN) for instance. The insulated layer is disposed between layers of a drain line 2, a gate line 3 and a counter signal line 50, and functions as a gate insulated layer for a thin-film transistors TFT, and in the capacity Cstg it functions as a dielectric substance film. The semiconductor layer 51 is formed adjacent to a drain line 2 on a gate line 3 in the area where the thin-film transistors TFT is disposed on the surface of the insulated layer, and it consists of amorphous silicon for instance. The details of the thin-film transistors TFT and the use of a black matrix are disclosed in U.S. Pat. No. 5,754,266.

<A Back Light Unit>

Figure 4:
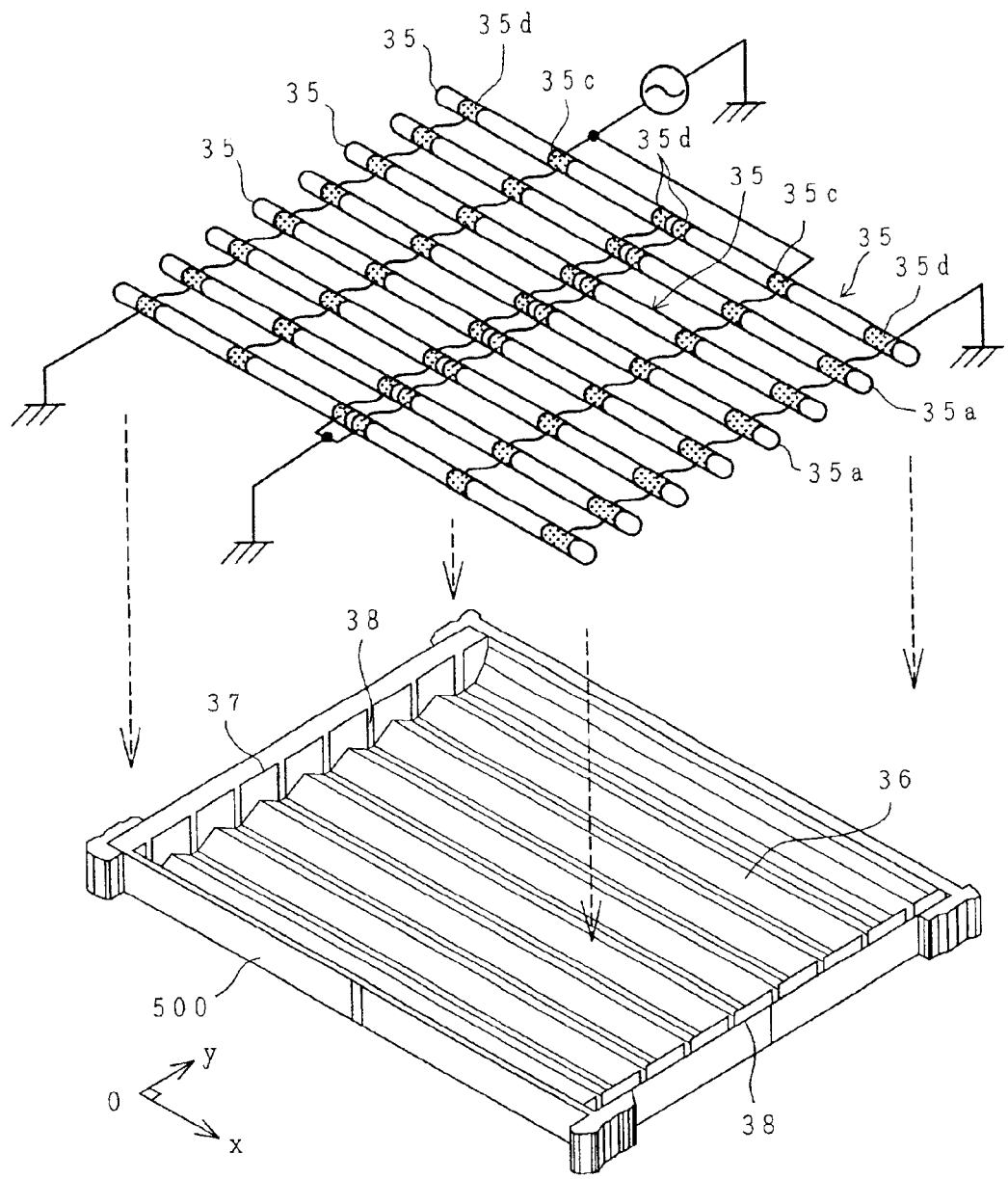
FIG. 4 is an exploded perspective view illustrating the back light unit.

FIG. 4 is an exploded perspective view illustrating the back light unit according to this invention. The back light unit 300 is arranged in the back of the liquid crystal display panel 400. The back light unit 300 is referred to as a direct back light type. The light sources 35 are arranged in the direction x of FIG. 4, are arrayed in parallel in the direction y of FIG. 4, and are spaced at equal intervals from each other (In FIG. 4, there are eight light sources).

The reflector 36 is arranged between the light sources 35 and the lower resin frame 500 for irradiating light from the light sources 35 onto the liquid crystal display panel 400. The reflector 36 is formed to have a wave-like configuration in the direction y of FIG. 4. The part where light sources 35 are formed is concave and a convexity is formed between each of the light sources 35. The reflector 36 is formed to an efficient shape to cause more light from each light sources 35 to be irradiated onto the liquid crystal display panel. In this case, the opposite sides 37 of the frame 500 have slits 38 spaced in the direction y of FIG. 4. The opposite ends of each light source 35 are set in oppositely disposed slits 38, which prevents the light sources 35 from shifting in the direction y.

In this example, six electrodes are arranged on each discharge tube 35 and are spaced on the discharge tube 35 in the direction x of FIG. 4 at intervals. Each electrode is composed of a ring of aluminum foil. A discharge tube 35 is inserted in the rings which form those electrodes. In embodiment 1, the electrodes are not fixed to a discharge tube 35. Therefore, each electrode can move in position in the direction x of FIG. 4. Each electrode is mutually connected by a conductive line which is supplied the ground potential or the power supply voltage. That is, the respective electrodes of the light sources 35 which are aligned in the direction y are connected together so as to be supplied with a suitable voltage.

Figure 5:
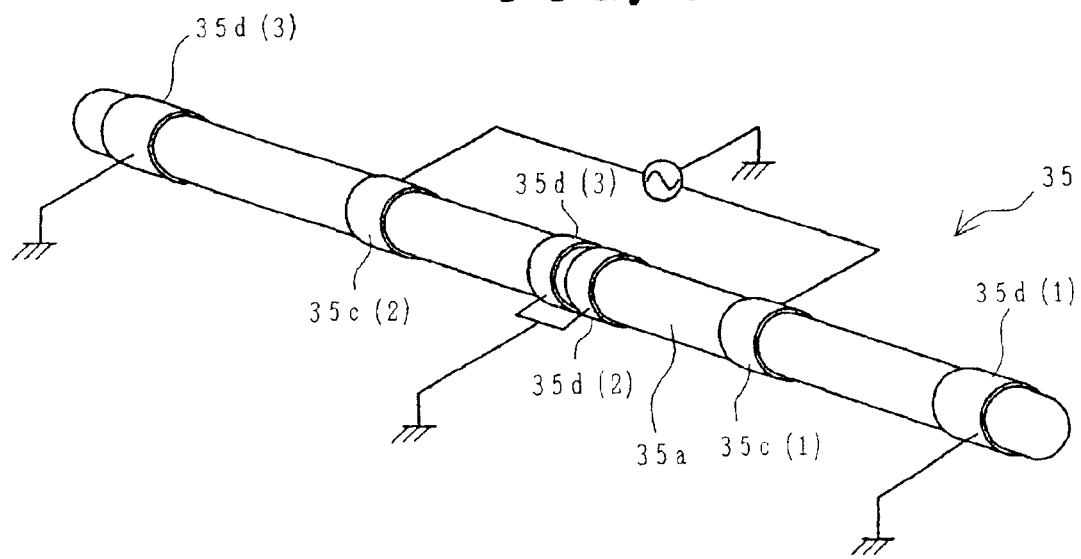
FIG. 5 is a perspective view illustrating the lamp tube in the back light unit.

FIG. 5 is a perspective view illustrating a lamp tube are used in the back light unit. The ground potential electrodes 35d are formed at the center of a discharge tube 35a and at both ends thereof, and the high voltage electrodes 35c are formed between them. The ground potential electrodes 35d(2) and 35d(3) are electrically separated and grounded through a conductive wire.

Figures 6A, 6B:
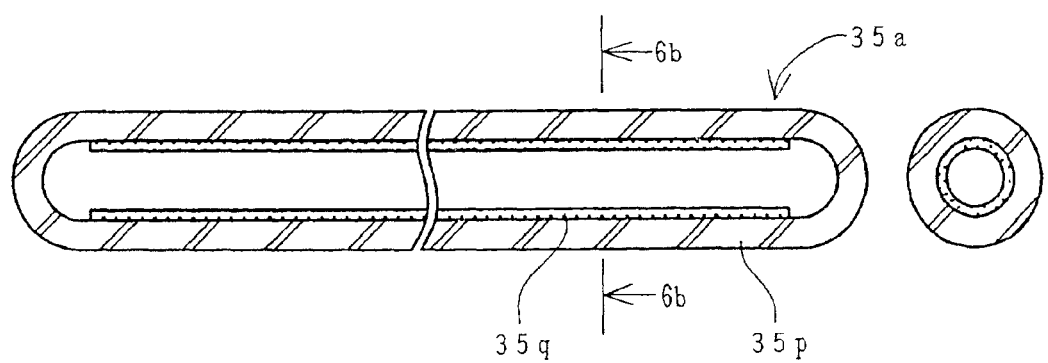
FIGS. 6A and 6B are longitudinal and cross sectional views of a lamp tube in a back light unit, respectively.

FIG. 6A is a longitudinal sectional view of a lamp tube in the back light unit. FIG. 6B is a sectional view of FIG. 6A taken on the line 6b—6b. Glass tube 35p is a cylindrical glass tube having both ends closed, and is 2.6 mm in outside diameter, 2.0 mm in inside diameter, and 390 mm in length for instance. A fluorescent material 35q is spread on the inner wall of glass tube 35p, and a Ne+Ar (5%) mixture gas and mercury with a gas pressure 60 Torr are enclosed in the glass tube 35p for instance.

The 800 Vp-p high cycle sine wave voltage of several MHz (1.5 MHz or more) is applied by the light sources 35 to the high voltage electrodes 35c. As a result, an electrical discharge is generated in a discharge tube 35a and activates the fluorescent material 35q, so that ultraviolet rays and visible light are generated. This electrical discharge is generated between the ground potential electrode 35d(1) and the high voltage electrode 35c(1), between the high voltage electrode 35c(1) and the ground potential electrode 35d(2), between the ground potential electrode 35d(3) and the high voltage electrode 35c(2), between the high voltage electrode 35c(2) and the ground potential electrode 35d(3).

It is not the high voltage electrodes 35c, but the ground potential electrodes 35d, that are arranged at both ends of a discharge tube 35a. As a result, an improvement in the efficiency of the electrical discharge can be achieved. The reason for this is that the high cycle electric field on the edge of a discharge tube becomes useless, when the high voltage electrodes 35c are arranged at both ends of a discharge tube 35a. That is, only half of the electric field contributes to the electrical discharge with such an arrangement. Thus, the ground potential electrodes 35d are arranged at both ends of a discharge tube 35a for avoiding a waste of energy.

Moreover, the ground potential electrodes 35d are arranged at the center of a discharge tube 35a in the form of electrodes 35d(2) and 35d(3). The reason for this is that the electrical discharge is strongly caused between one of the high voltage electrodes 35c(1) or 35c(2) and the ground potential electrode 35d, when the ground potential electrode at the center is composed of one electrode. Therefore, the ground potential electrode arranged at the center between two high voltage electrodes is divided to pair with each high voltage electrode to ensure that the electrical discharge will be uniform.

Figure 7A:
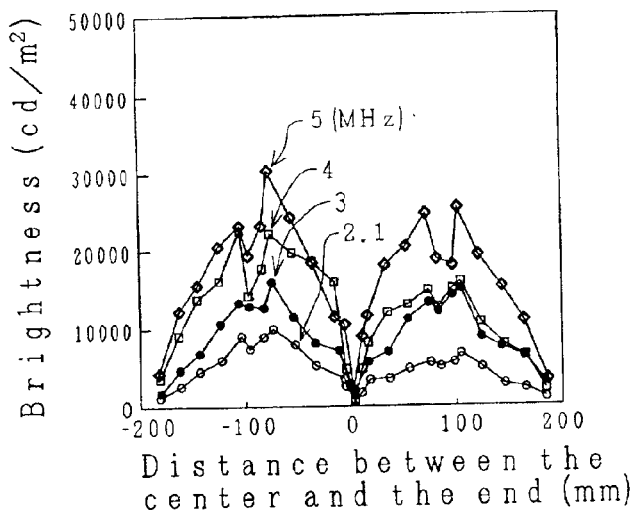
FIGS. 7A, 7B and 7C are graphs illustrating the relationships among the brightness of the back light unit and the distance from the center to the edge of the lamp tube.
Figure 7B:
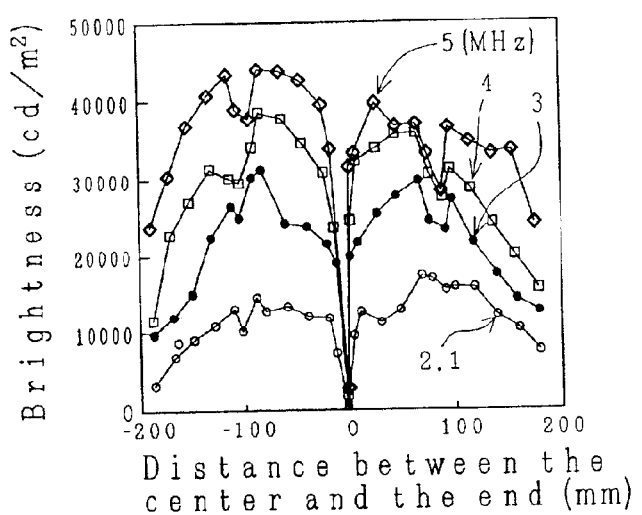
Figure 7C:
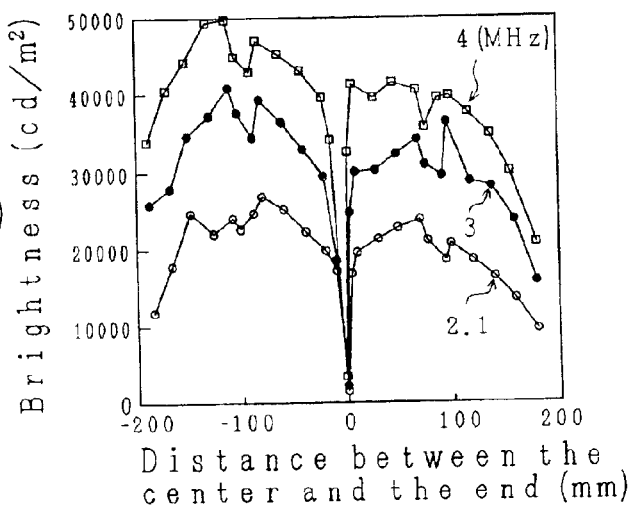

FIGS. 7A, 7B and 7C are graphs illustrating the relationships among the brightness of the back light unit and the distance from the center to the edge of the lamp tube. A discharge tube having a length of 390 mm was used. The arrangement of the electrodes was like that shown in FIG. 5. FIG. 7A shows a case using 800 Vp-p, FIG. 7B shows a case using 900 Vp-p, FIG. 7C shows a case using 1000 Vp-p. Almost uniform brightness is ascertained from FIGS. 7A, 7B and 7C, excluding the area near the electrode.

Figures 8A, 8B:
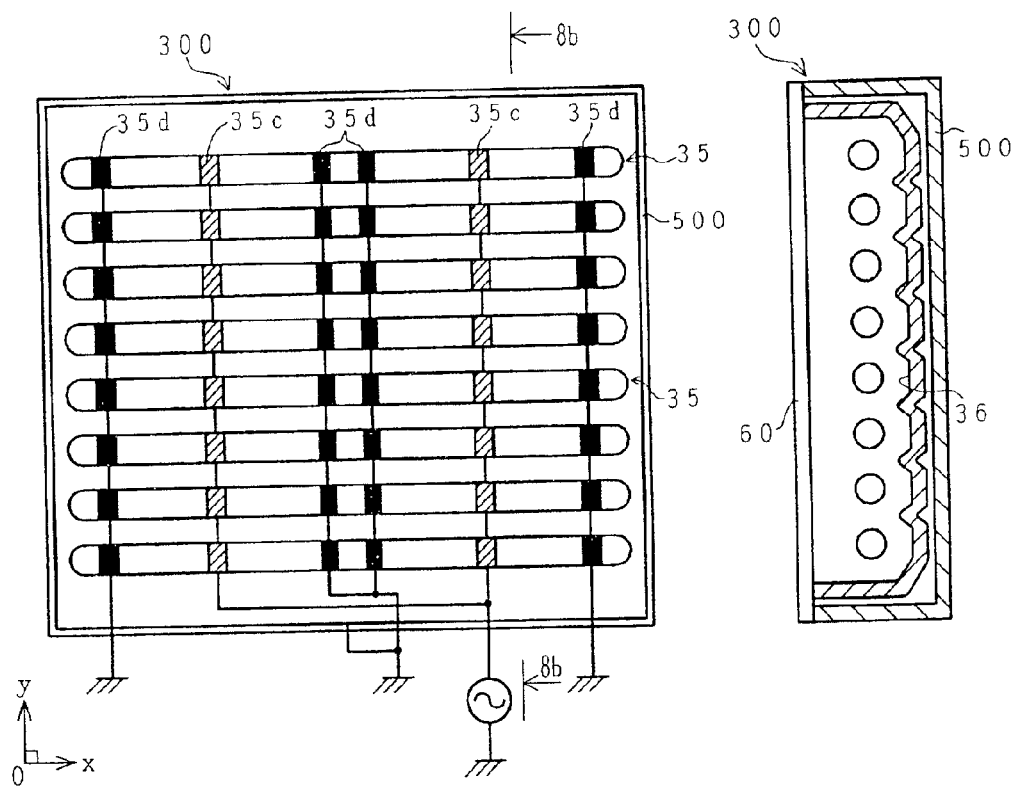
FIGS. 8A and 8B are a plan view and a sectional view, respectively, illustrating the back light unit.

FIGS. 8A and 8B are a plan view and a sectional view, respectively, illustrating the back light unit. FIG. 8B is the sectional view of FIG. 8A taken on the line b—b. The eight light sources 35 extend in the direction x of FIG. 8A and are arranged in parallel in the direction y at almost equal intervals in the back light unit 300, which is disposed opposite to the liquid crystal display panel 400. In this case, the light irradiation is not uniform in the area between the light sources, or in the area which is formed by the electrodes. However, this inconvenience can be canceled by use of a diffusing plate 60 arranged between the back light unit 300 and the liquid crystal display panel 400. Moreover, the diffusing plate 60 can change the means which makes at least the illuminance of light from a back light onto the liquid crystal display panel more uniform.

Figure 9:
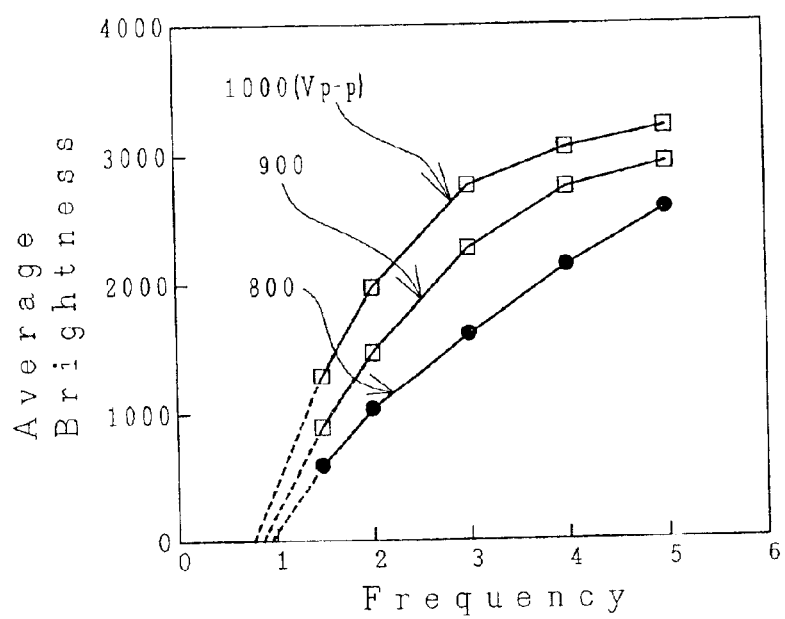
FIG. 9 is a graph illustrating the relationships among the average brightness of the back light unit and the frequency of a power supply unit.

FIG. 9 is a graph illustrating the relationships among the average brightness of the back light unit and the frequency of a power supply unit. FIG. 9 shows that brightness improves by increasing the frequency. In the back light unit 300 of embodiment 1, since the electrodes are arranged outside the discharge tube, mercury inside the tube is not consumed. Therefore, light sources 35 will have a long life span, and the liquid crystal display's life span can be improved as well.

The ground potential electrodes 35d and the high voltage electrodes 35c of light sources 35 can be moved in the direction x of FIG. 8A, and the brightness between the high voltage electrodes 35c and the ground potential electrodes 35d of each of the light sources 35 can be adjusted by such movement. Therefore, a back light unit 300 with uniform side illuminance can be achieved.

<A Resin Frame>

The lower resin frame 500 forms a part of the liquid crystal display module and houses the back light unit 300. Here, the lower resin frame 500 has the shape of an open box which only a bottom and sides. A diffusing plate 60, with which the back light unit 300 is covered forms the top side. The diffusing plate diffuses light from each of the light sources 35 of the back light unit 300. As a result, uniform light for which brightness is not biased can be irradiated onto the liquid crystal display panel 400. In this case, the thickness of the lower resin frame 500 is small. The decreased mechanical strength resulting from the small thickness can be reinforced by the inner frame 700.

High cycle power supply substrate 40 (for instance, AC/AC invertor) provided to supply the high cycle voltage to light sources 35 is installed in the back of this lower resin frame 500. The wiring from this high cycle power supply substrate 40 is connected with the high-pressure side electrode and earth side electrode of each of the light sources 35.

Figure 10:
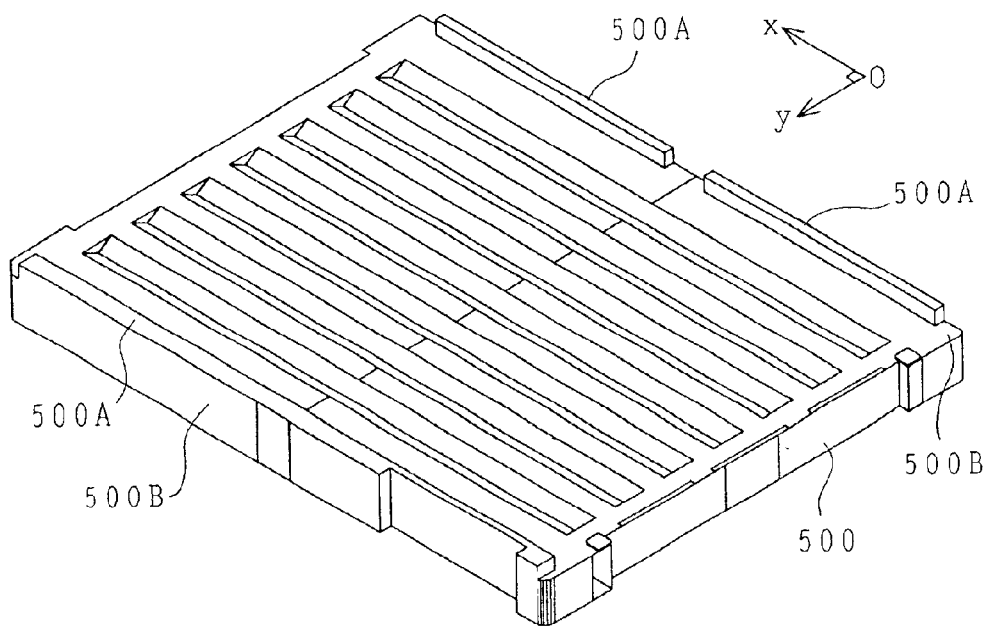
FIG. 10 is a perspective view illustrating the resin frame of the upper side of the back light unit.

FIG. 10 is a perspective view illustrating the resin frame 500 of the back light unit. The lower resin frame 500 has projections 500A, which project in parallel at each vicinity and extend in the direction x, and side parts 500B. The lower resin frame 500 and the inner frame 700 increase the strength of the module. Moreover, the height of the projection 500A of the lower resin frame 500 is formed to be higher than the height of the high cycle power supply substrate 40. The side part 500B is arranged to be adjacent to the control circuit board 10. Therefore, the area of the control circuit board 10, having a complex arrangement of circuit components, can be enlarged. Moreover, the inner frame 700 is formed between the control circuit board 10 and the liquid crystal display panel 400. That is, the inner frame 700 operates as a shield against electromagnetic waves. The projection 500 is given full effect even if it is formed in the direction y.

<The High Cycle Power Supply Substrate>

Figure 11:
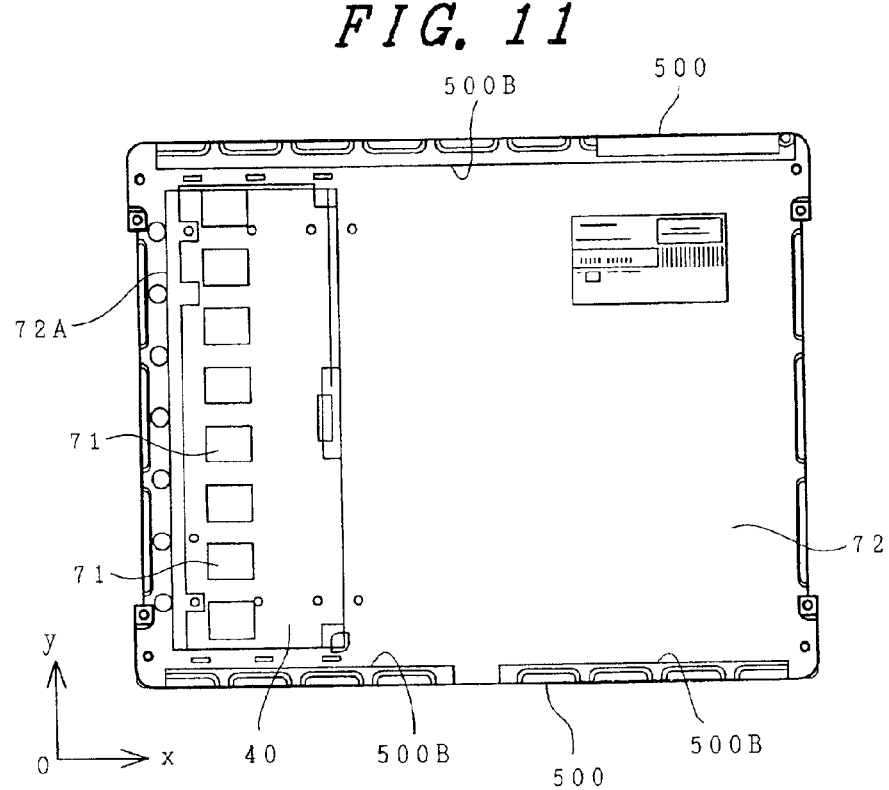
FIG. 11 is a plan view of the underside of the back light unit.

FIG. 11 shows the underside of the back light unit. The high cycle power supply substrate 40 has a respective transformer 71 for each of the light sources 35 of the back light unit 300. It is also possible that this transformer 71 is/are formed from one, a couple of 8 tubes, to four, a couple of 2 tubes. Moreover, the high cycle power supply substrate 40 is arranged through a shield board 72, installed at the back of the lower resin frame 500. A part of shield board 72 (forming part of the high cycle power supply substrate 40) has an open area 72A. The purpose of this is to avoid the generation of an electric current on the shield board 72 by transformer 71. Moreover, the high cycle power supply substrate 40 has a wiring layer for the shield. And, a DC/AC invertor 40 is formed to a height such that it does not protrude above projections 500A.

<An Inner Flame>

The inner frame 700 is arranged between the liquid crystal display panel 400 and the diffusing plate (not shown in FIG. 2). The inner frame 700 has an open side 42 formed in the display area of the liquid crystal display panel 400 and is composed of a thin metallic board. The lower resin frame 500 is fixed via a diffusing plate on the inner frame 700. A spacer 44 for positioning the liquid crystal display panel 100 is formed on a part of the inner frame 700 where the liquid crystal display panel 400 is mounted. As a result, the liquid crystal display panel 100 can be arranged on the inner frame 700 at an accurate position. And, the inner frame 700 has sides 46 united with each other. That is, the open side 42 is arranged at the inner frame 700 with the bottom formed of a metallic floor of the box.

A diffusing plate is arranged between the inner frame 700 and the lower resin frame 500. The inner wall of side 46 of the inner frame 700 is opposed to the outside wall on the side of the lower resin frame 500. The inner frame 700 becomes part of the back light unit along with the lower resin frame 500. The mechanical strength can be improved without enlarging the thickness of the lower resin frame 500. That is, the inner frame 700 and the lower resin frame 500 have an improved mechanical strength and a strength against a diagonal twist. Moreover, the projection 500A contributes a resistance to diagonal twist too. As a result, the display area of a liquid crystal display can be wider and still maintain enough strength. Moreover, the mechanical strength of the inner frame is better and the handling of the module is easier than in a module in which the frame has a narrow side.

In embodiment 2, a control circuit board 10 and DC/DC converter substrate 11 are arranged on side 46 of the inner frame 700. As a result, the display area of the liquid crystal display panel 400 can be expanded. The control circuit on the circuit board 10 is connected respectively through the flexible printed gate circuit 15, the flexible printed drain circuit 16A, 16B, and a connection port 18, 19A, and 19B. As a result, the electromagnetic waves generated from the control circuit can be shielded from other circuits.

<An Upper Frame>

The upper frame 800 has the function to fix the liquid crystal display panel 400, the inner frame 700, and the diffusing plate with the lower resin frame 500. A liquid crystal display module is composed of the upper frame 800 and the lower resin frame 500 and intervening elements. The upper frame 800 has open side 48 which corresponds to the display area the liquid crystal display panel 400. Moreover, the upper frame 800 functions as a shield against EMI.

Figure 12:
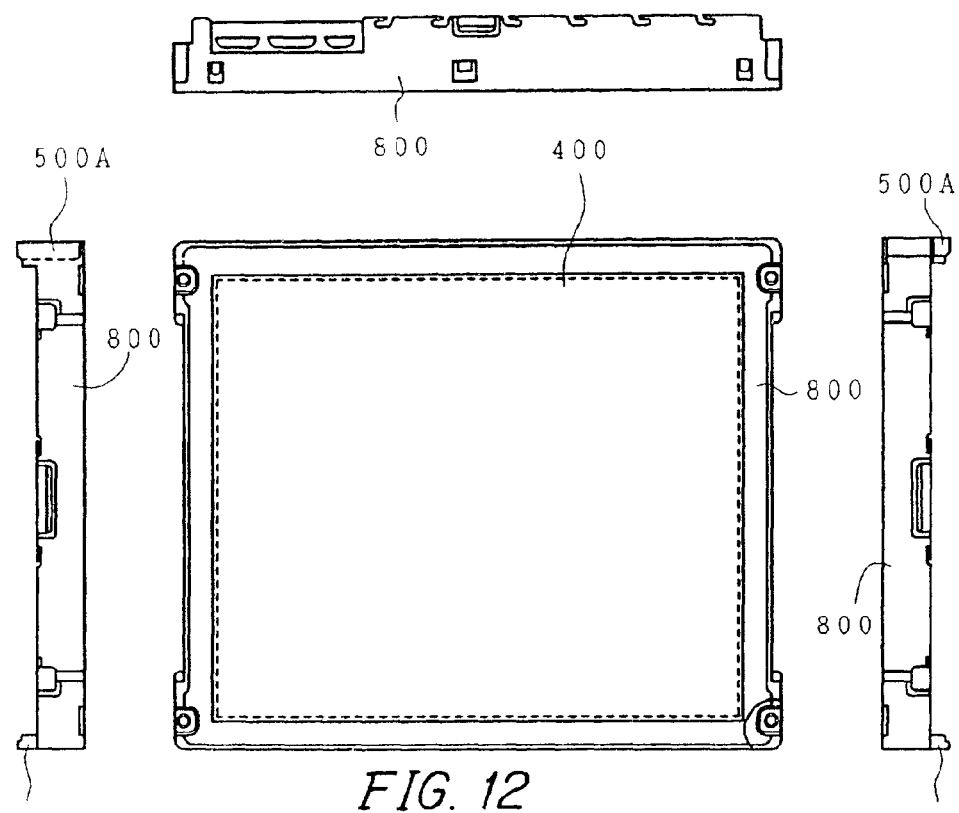

FIG. 12 is the front view and FIGS. 12(a) to 12(d) are side views of the liquid crystal display panel. The lower resin frame 500 has projections 500A which function to increase panel strength.

Figure 13:
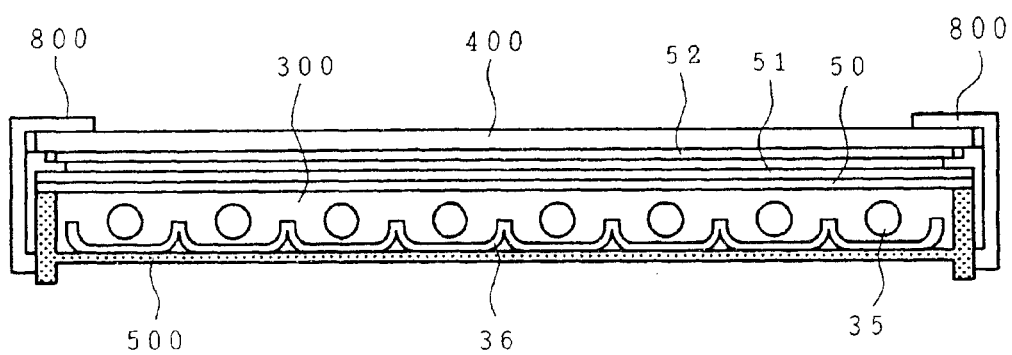
FIG. 13 is a sectional view of the liquid crystal display panel of embodiment 2.

FIG. 13 is a sectional view of the liquid crystal display panel of an embodiment 2 as seen on the line 8b—8b of FIG. 8A. The embodiment 2 differs from embodiment 1 in that the back light unit 300 is covered with a diffusing plate 50, and an electromagnetic shield board 51 is arranged on the liquid crystal display panel unit 400 side of the diffusing plate 50. The shield board is for shielding the electromagnetic waves generated from light sources 35 of the back light unit 300. For instance, the electromagnetic shield board 51 is made of a transparent conductive sheet or a metallic mesh. As a result, EMI (electromagnetic wave interference) of light sources 35 driven with the high cycle voltage can be prevented. And, a reflector 36 made of a metallic material also can prevent EMI.

A diffusing plate 52 is arranged on the a liquid crystal display panel unit 400. As a result, the light irradiation onto the liquid crystal display panel unit 400 from the back light unit 300 becomes more uniform due to the presence of the diffusing plate 52 and the diffusing plate 50. Either the lower resin frame 500 or the reflector 36 may be made of a metallic material and be covered by the electromagnetic shield board 51 for completely shielding against EMI.

Figure 14A:
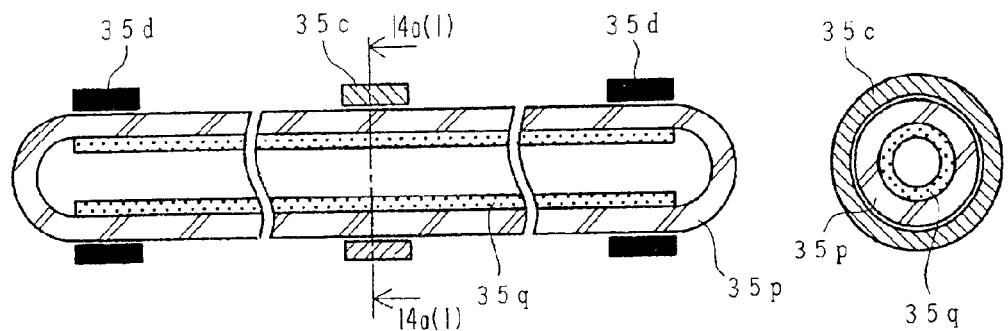
FIGS. 14A(1), 14B(1) and 14C(1) are sectional views taken on lines 14a(1)—14a(1), 14b(1)—14b(1) and 14c(1)—14c(1) in FIGS. 14A, 14B and 14C, respectively.
Figure 14B:
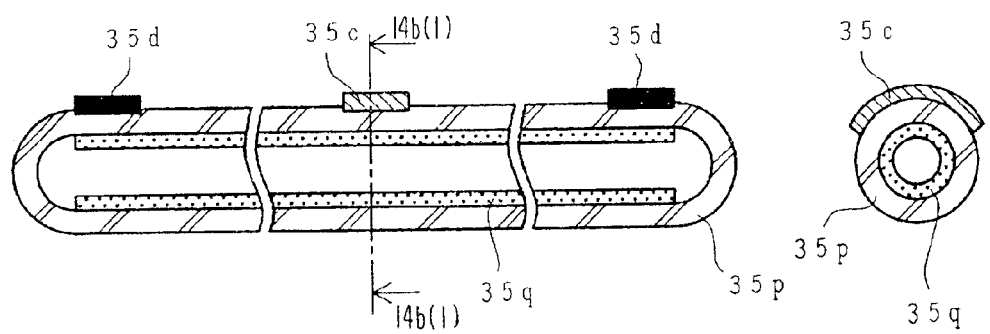
Figure 14C:
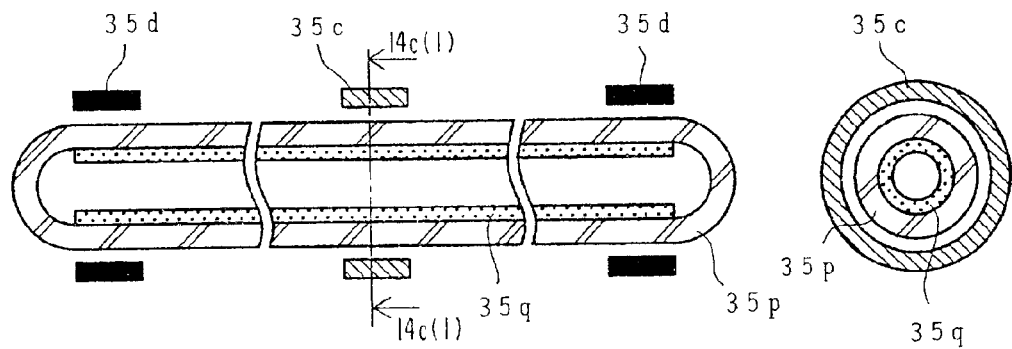

FIGS. 14A, 14B, and 14C are a sectional views of a lamp tube in a back light unit according to an embodiment 3. In FIG. 14A, an electrode of the light sources 35 has a ring shape and is formed on a discharge tube. A section along line a'—a' is shown in FIG. 14A(1). In FIG. 14B, the electrode is formed partially around the discharge tube. A section along line b'—b' is shown in FIG. 14B(1). In FIG. 14C, the electrode is a ring shape and has an interval or space between the electrode and the discharge tube. A section along line c'—c' is shown in FIG. 14C(1).

FIGS. 15A, 15B, 15C and 15D are diagrams illustrating various electrode arrangements of the lamp tube according to an embodiment 4. FIGS. 16A, 16B, 16C and 16D are diagrams illustrating further electrode arrangements of the lamp tube according to embodiment 4.

Figure 15A:
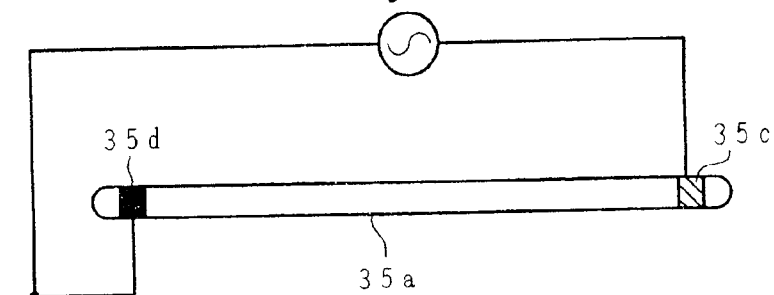
FIGS. 15A, 15B, 15C and 15D are plan views illustrating electrode arrangements of the lamp tube of embodiment 4.

The ground potential electrode 35d and the high voltage electrode 35c are formed at opposite ends of a discharge tube in FIG. 15A. The length of the discharge tube 35a is limited, but a light source 35 can function by itself by increasing the voltage of the power supply.

Figure 15B:
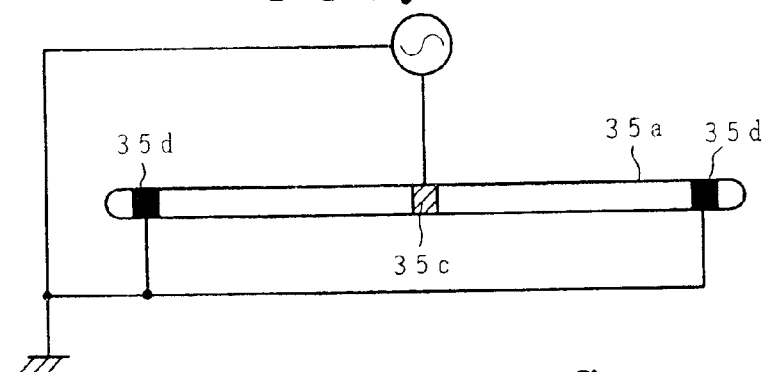

FIG. 15B shows a single high voltage electrode 35c formed at the center of a discharge tube 35a and the ground potential electrodes 35d formed at each end.

Figure 15C:
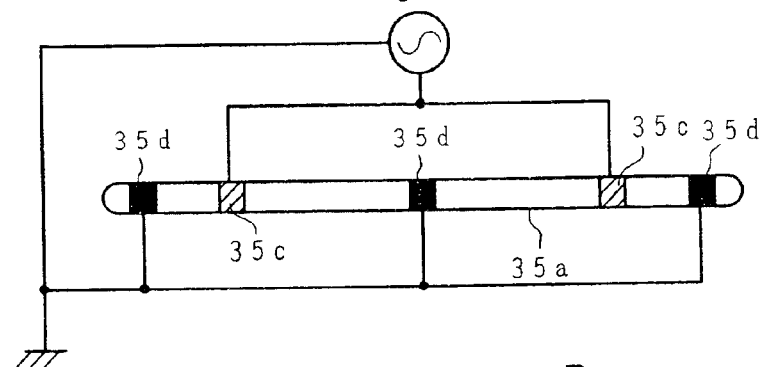

In FIG. 15C, the ground potential electrodes 35d are formed at the center of a discharge tube 35a and both ends, respectively, and the high voltage electrodes 35c are formed between respective pairs of ground potential electrodes 35d.

Figure 15D:
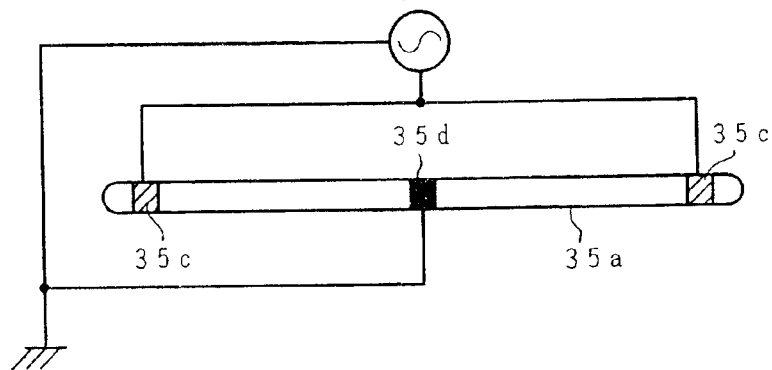

FIG. 15D shows a single ground potential electrode 35d formed at the center of a discharge tube 35a and the high voltage electrodes 35c formed at opposite ends.

Figure 16A:
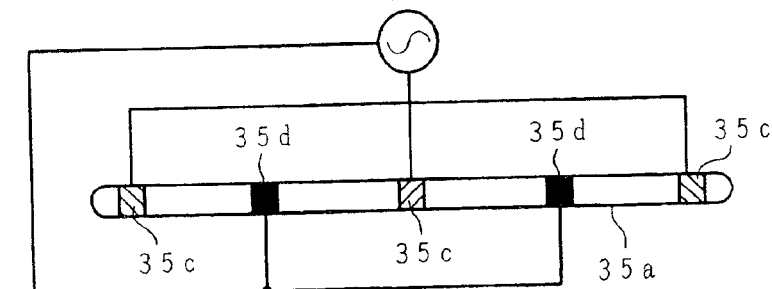
FIGS. 16A, 16B, 16C and 16D are plan views illustrating electrode arrangements of the lamp tube of embodiment 4.

FIG. 16A shows high voltage electrodes 35c formed at the center of a discharge tube 35a and at both ends of the tube, and the ground potential electrodes 35d formed respectively between pairs of the high voltage electrodes 35c.

Figure 16B:
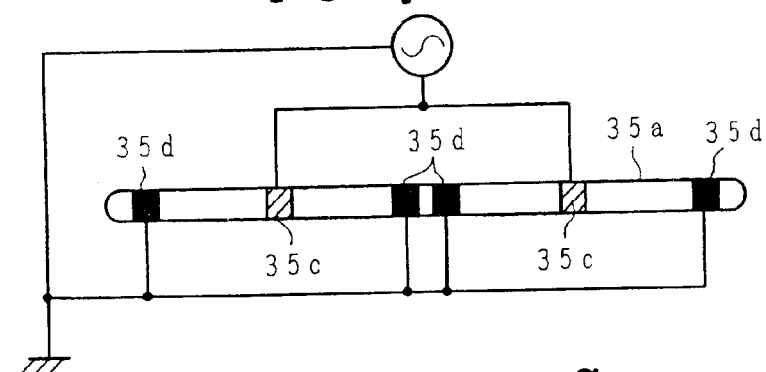

FIG. 16B shows the ground potential electrodes 35d formed at the center of a discharge tube 35a and both ends, respectively, and the high voltage electrodes 35c formed between respective ground potential electrodes 35d, with the ground potential electrode 35d at the center being divided into two spaced electrodes.

Figure 16C:
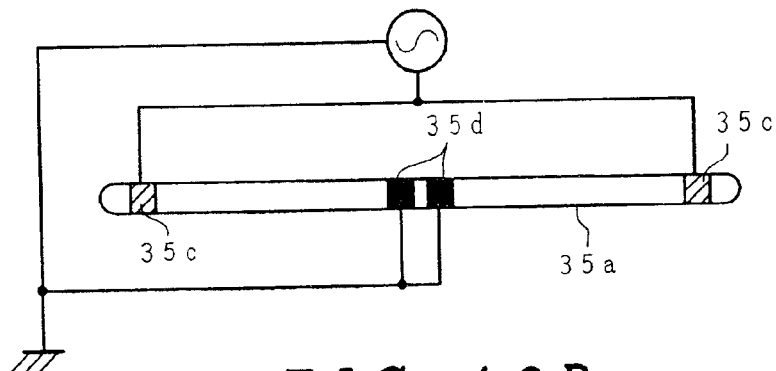

FIG. 16C shows a ground potential electrode 35d formed at the center of a discharge tube 35a, and high voltage electrodes 35c formed at each end, with the ground potential electrode 35d at the center being divided into two spaced electrodes.

Figure 16D:
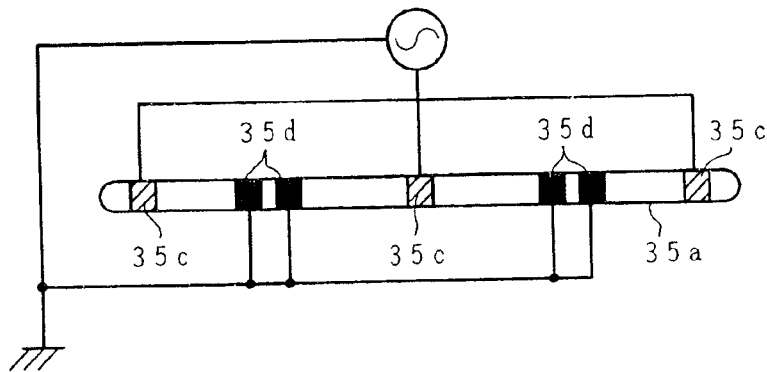

FIG. 16D shows high voltage electrodes 35c formed at the center of a discharge tube 35a and at both ends, respectively, and ground potential electrodes 35d formed between respective high voltage electrodes 35c, with each ground potential electrode 35d being divided into two spaced electrodes.

The electrode at least needs to couple the ground potential electrodes 35d and the high voltage electrodes 35c. And, the number of electrodes is selected according to the length of a discharge tube and/or the voltage of the power supply.

Figure 17A:
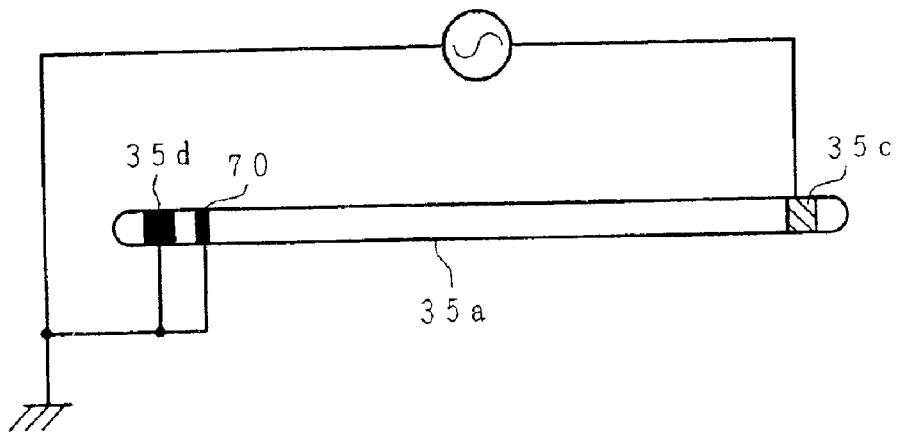
FIGS. 17A, 17B and 17C are plan views illustrating the electrode arrangements of the lamp tube of embodiment 5.
Figure 17B:
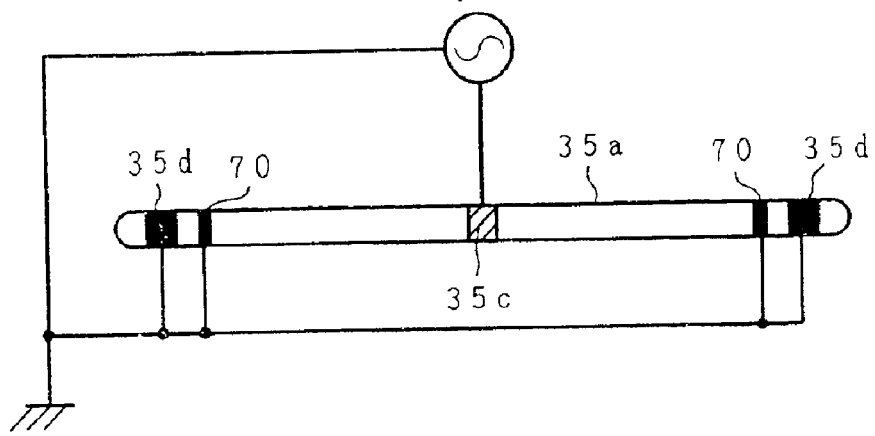
Figure 17C:
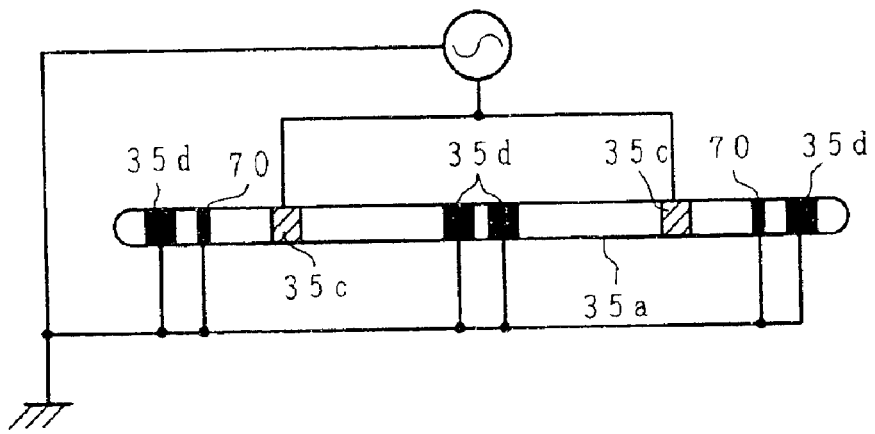

FIGS. 17A, 17B and 17C are diagrams illustrating electrode arrangements of the lamp tube according to an embodiment 5. FIG. 17A corresponds in general arrangement to FIG. 15A, FIG. 17B corresponds in general arrangement to FIG. 15B, and FIG. 17C corresponds in general arrangement to FIG. 16B.

The ground potential electrodes have an assistance electrode 70 whose width is smaller than the electrodes 35d, and the assistance electrodes 70 are formed adjacent the ground potential electrodes 35d. When the ground potential electrodes 35d and the high voltage electrodes 35c are discharged, an assistance electrode 70 prevents a brightness increase in the direction x. The assistance electrode is available to form two or more. The assistance electrode 70 will cause the electrical discharge of the lamp tube to be uniform by adjusting the minuteness in the direction x.

Figure 18:
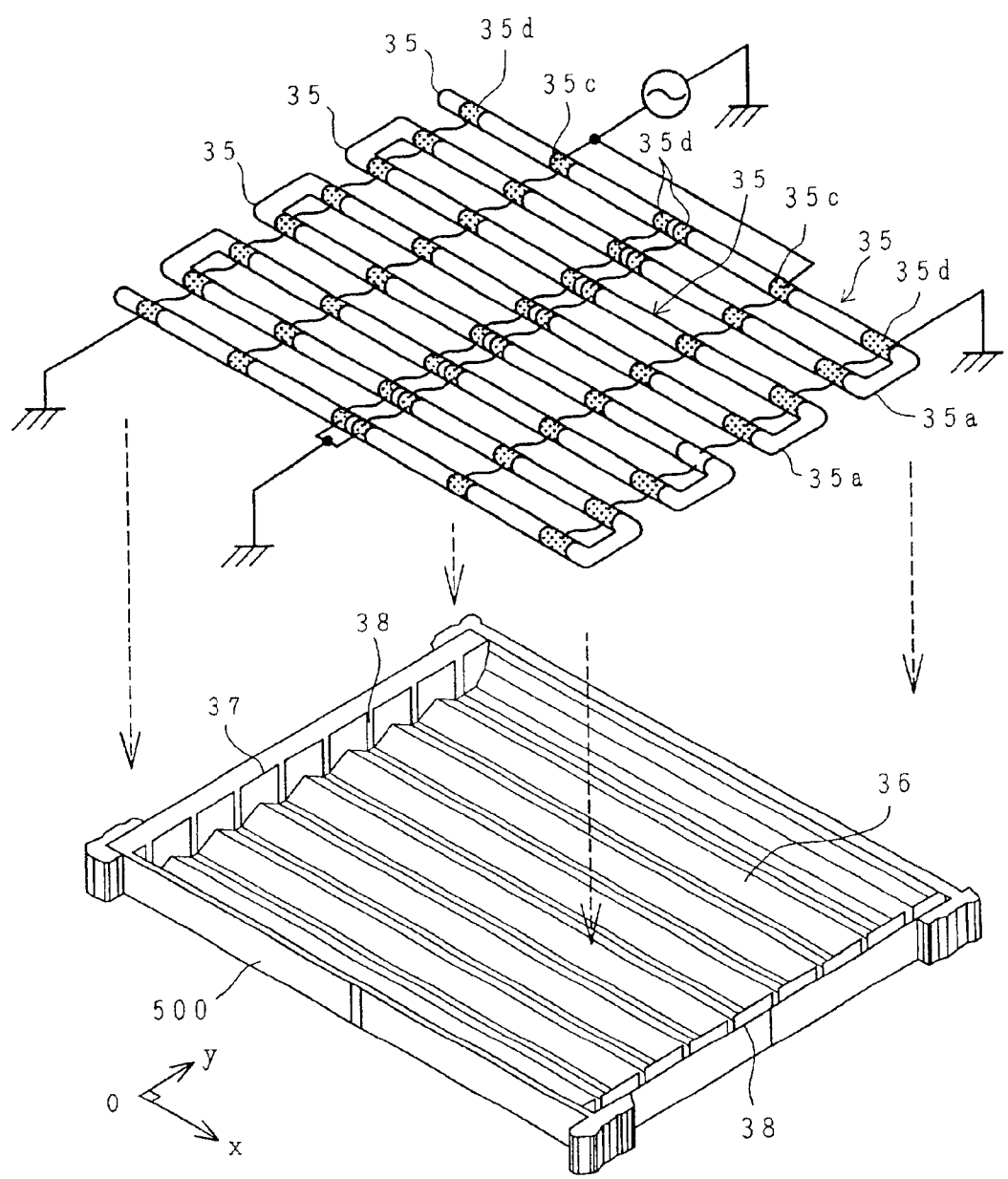
FIG. 18 is an exploded perspective view illustrating the back light unit of embodiment 6.

FIG. 18 is an exploded perspective view illustrating the back light unit of an embodiment 6. The main difference from the embodiment of FIG. 4 is in the bending of the discharge tube 35a. In this regard, the discharge tube 35a is composed of one consecutive tube.

Figure 19:
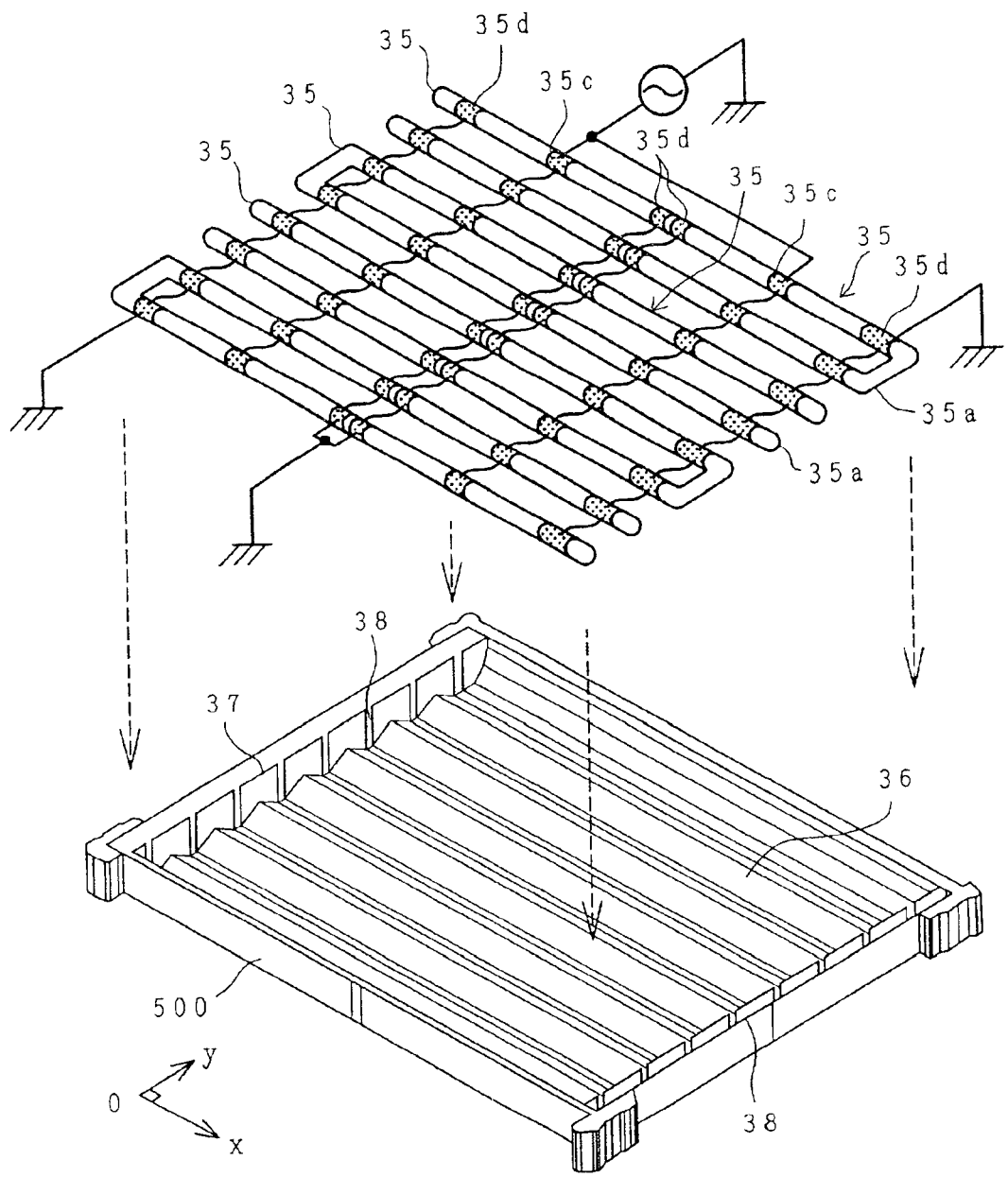
FIG. 19 is an exploded perspective view illustrating the back light unit of embodiment 7.

Using the discharge tube 35a which is wound back and forth, it is possible to reduce the number of tubes used for display panel, since the amount of the light irradiation is larger than that of a straight tube. As a result, manufacturing and assembly become easy. FIG. 19 shows another embodiment in which two or more discharge tubes 35a are wound in pairs.

According to these embodiments, the liquid crystal display unit has a life span which is increased without the need to replace the lamp tube or the back light unit. Concretely, the electrodes of the light source which control the liquid crystal display according to this invention are arranged outside the tube, whereby the consumption of mercury inside the tube is reduced.

What is claimed is:

1. A liquid crystal display comprising:
    a liquid crystal display panel for modulating light to form an image; and
    a back light unit having a plurality of lamp tubes without inside electrodes and which are discharged by outside electrodes disposed along an outer surface of one of said plurality of lamp tubes, said back light unit being disposed behind said liquid crystal display panel;
    wherein one outside electrode disposed at said one of said plurality of lamp tubes is electrically connected with another outside electrode disposed at an adjacent another of said plurality of lamp tubes.

2. A liquid crystal display according to claim 1, wherein said at least one of said plurality of lamp tubes has at least one power supply electrode and at least one ground electrode.

3. A liquid crystal display according to claim 1, wherein said one of said plurality of lamp tubes has at least one bent portion.

4. A liquid crystal display according to claim 1, wherein said one outside electrode disposed at said one of said plurality of lamp tubes is a power supply electrode and is electrically connected with said another outside electrode which is another power supply electrode disposed at said adjacent another of said plurality of lamp tubes.

5. A liquid crystal display according to claim 4, wherein said outside electrodes include at least one ground electrode and one outside ground electrode disposed at said least one of said plurality of lamp tubes is electrically connected with another outside ground electrode disposed at said adjacent another of said plurality of lamp tubes.

6. A liquid crystal display according to claim 1, wherein said one outside electrode disposed at said at least one of said plurality of lamp tubes is a power supply electrode and is electrically connected with said another outside electrode which is another power supply electrode disposed at said adjacent another of said plurality of lamp tubes.

7. A liquid crystal display according to claim 6, wherein said one of said plurality of substantially parallel line portions has at least one power supply electrode and at least one ground electrode.

8. A liquid crystal display comprising:

a liquid crystal display panel for modulating light to form an image; and a back light unit having at least one lamp tube without inside electrodes and which is discharged by outside electrodes disposed along an outer surface of said at least one lamp tube, said back light unit being disposed behind said liquid crystal display panel;

wherein said outside electrodes include:

first and second power supply electrodes: and first and second ground electrodes disposed between said first and second ground electrodes.

9. A liquid crystal display according to claim 8, wherein said outside electrodes further include at least one ground electrode disposed outside of an area between said first and second power supply electrodes.

10. A liquid crystal display according to claim 8, wherein said outside electrodes which are disposed at both ends of said at least one lamp tube are said ground electrodes.

11. A liquid crystal display according to claim 8, wherein said outside electrodes which are disposed at both ends of said at least one lamp tube are said power supply electrodes.

12. A liquid crystal display according to claim 8, wherein said outside electrodes further include:

a third power supply electrode; and third and fourth ground electrodes disposed between said second and third power supply electrode;

wherein said second power supply electrode is disposed between said first and third power supply electrode.

13. A liquid crystal display according to claim 8, wherein said back light unit has a plurality of said lamp tubes.

14. A liquid crystal display according to claim 8, wherein said at least one lamp tube has at least one bent portion.

15. A liquid crystal display according to claim 8, wherein said at least one lamp tube includes a material selected from the group consisting of a fluorescence material, an inert material and a material for generating ultraviolet rays.

16. A liquid crystal display according to claim 8, wherein said at least one lamp tube is pressurized in a range of 10 to 100 Torr.

17. A liquid crystal display according to claim 8, wherein said at least one lamp tube is pressurized in a range of 50 to 70 Torr.

18. A liquid crystal display according to claim 8, wherein said outside electrodes are formed in one of a ring shape and an arc shape on said at least one lamp tube.

19. A liquid crystal display according to claim 8, wherein said power supply electrodes are supplied with a high frequency voltage of at least 1.5 MHz.

20. A liquid crystal display according to claim 8, wherein said back light unit has an electromagnetic shield material for said at least one lamp tube.

21. A liquid crystal display comprising:

a liquid crystal display panel for modulating light to form an image; and a back light unit having a plurality of lamp tubes without inside electrodes and which are discharged by outside electrodes disposed along an outer surface of said at least one lamp tube, said back light unit being disposed behind said liquid crystal display panel;

wherein said outside electrodes include at least two kinds of electrodes having different voltages applied thereto;

a plurality of groups of electrodes are constructed so that electrodes in each group are arranged in a substantially line configuration with respect to at direction transverse to an extending direction of a respective one of said lamp tubes and electrically interconnected with an electrode of an adjacent lamp tube;

each group of electrodes is arranged at a different position of said plurality of lamp tubes with respect to the extending direction of a respective one of said lamp tubes so that a same kind of said at least two kinds of electrodes is only arranged in the same line with respect to the transverse direction.

22. A liquid crystal display according to claim 21, wherein said outside electrodes include at least one power supply electrode.

23. A liquid crystal display according to claim 22, wherein said outside electrodes include at least one ground electrode.

* * * * *